United States Patent [19]

Mori et al.

[11] Patent Number: 4,849,478

[45] Date of Patent: Jul. 18, 1989

[54] OIL-RESISTANT RUBBER COMPOSITION

[75] Inventors: Yoji Mori; Yoshiaki Kawamura; Hironori Matsumoto; Yasuhiko Takemura, all of Yokkaichi, Japan

[73] Assignee: Japan Synthetic Rubber Co., Ltd., Tokyo, Japan

[21] Appl. No.: 158,037

[22] Filed: Feb. 16, 1988

Related U.S. Application Data

[63] Continuation of Ser. No. 31,200, Mar. 27, 1987, abandoned, which is a continuation of Ser. No. 763,607, Aug. 8, 1985, abandoned.

[30] Foreign Application Priority Data

Aug. 21, 1984 [JP] Japan ................................ 59-173772

[51] Int. Cl.⁴ ........................ C08L 9/00; C08L 45/00; C08L 47/00
[52] U.S. Cl. ........................ 525/211; 525/97; 525/216; 525/233; 525/241
[58] Field of Search ................... 525/211, 97, 233

[56] References Cited

U.S. PATENT DOCUMENTS 3,646,168  2/1972  Barrett .................................. 25/211

*Primary Examiner*—Jacob Ziegler
*Attorney, Agent, or Firm*—Oblon, Fisher, Spivak, McClelland & Maier

[57] ABSTRACT

An oil-resistant rubber composition comprising (A) 90 to 10 parts by weight of an unsaturated nitrile-conjugated diene rubber having a $\Delta Tg$ of 58° C. or more and an average bound nitrile content of 15 to 50% by weight, (B) 10 to 90 parts by weight of at least one rubber selected from the group consisting of an ethylene-propylene type copolymer rubber, a natural rubber and a polyisoprene and (C) 0 to 50 parts by weight, per 100 parts by weight of the total of (A) and (B), of at least one component (C) selected from the group consisting of a styrene polymer and a polyalkenamer. Said rubber composition is oil-resistant and excellent in mechanical properties such as tear strength, resistance to crack growth, etc.

8 Claims, 2 Drawing Sheets

C: MIDDLE POINT BETWEEN A AND B $\frac{x}{y} \times 100$ : INTEGRATED AMOUNT OF EXISTENCE PROBABILITY OF COMPONENT HAVING A Tg OF −73°C OR LESS

OIL-RESISTANT RUBBER COMPOSITION

This application is a continuation of application Ser. No. 031,200, filed on Mar. 27, 1987, now abandoned, which is a continuation of application Ser. No. 763,607, filed on Aug. 8, 1985, now abandoned.

This invention relates to an oil-resistant rubber composition having excellent mechanical properties.

Blending at least two different elastomers to obtain a blend of novel properties which cannot be obtained from each of these elastomers has long been practiced. This blending method is used not only to impart new properties but also to enhance processability and to reduce material cost. Typical examples of the above elastomer blend are a blend composition of a styrene-butadiene rubber (hereinunder referred to as SBR) and a polybutadiene rubber (hereinunder referred to as BR), which is used as a material for tire tread, and a blend composition of a SBR and an ethylene-propylene-non-conjugated diene rubber (hereinunder referred to as EPDM), which is used as a material for side wall of tire.

In blending an acrylonitrile-butadiene rubber (hereinunder referred to as NBR) with a low polarity rubber or an EPDM with a diene rubber, generally, the resulting blend is inferior in mechanical properties to each component before blending.

In order to overcome such a drawback in blending a diene rubber with an EPDM, R. T. Morrissery have proposed a method of halogenating an EPDM [Rubber Chem. Technol., 44, 1025 (1971)] and R. P. Mastromatteo et al. have proposed a method of using, as a vulcanizing accelerator, a dialkyldithiocarbamic acid salt having long chain alkyl groups or a tetraalkylthiuram disulfide [Rubber Chem. Technal., 44, 1065 (1971)]. Also, Hashimoto et al. have proposed a method wherein an EPDM is reacted with sulfur and a vulcanizing accelerator to form an EPDM having pendant sulfur and then the EPDM is blended with other rubber [Journal of the Society of Rubber Industry, Japan, 49, 236, 246 (1976)].

These methods are fairly effective when the diene rubber is a natural rubber or a SBR or a BR, these having a low polarity. However, when the diene rubber is an NBR having a high polarity, the effects of these methods are small and the rubber blends are greatly inferior in mechanical properties to before blending and cannot be put into practical use.

The present inventors have made extensive research in view of these points, and have consequently found that an oil-resistant rubber composition having good mechanical properties can be produced by blending an NBR having a large $\Delta Tg$ and a rubber having a low polarity. The present inventors have also found that addition of a styrene polymer or a polyalkenamer to said composition results further in an improvement in mechanical properties such as tear strength, resistance to crack growth and the like.

According to this invention, there is provided an oil-resistant rubber composition comprising (A) 90 to 10 parts by weight of an unsaturated nitrile-conjugated diene rubber having a $\Delta Tg$ of 58° C. or more and an average bound nitrile content of 15 to 50% by weight, (B) 10 to 90 parts by weight of at least one rubber selected from the group consisting of an ethylene-propylene type copolymer rubber, a natural rubber and a polyisoprene and (C) 0 to 50 parts by weight, per 100 parts by weight of the total of (A) and (B), of at least one member selected from a styrene polymer and a polyalkenamer.

The unsaturated nitrile-conjugated diene rubber (A) in this invention is a copolymer of (1) an unsaturated nitrile such as acrylonitrile, methacrylonitrile or the like and (2) a conjugated diene such as butadiene, isoprene or the like. As the rubber (A), an acrylonitrile-butadiene rubber (NBR) is particularly preferable.

The unsaturated nitrile-conjugated diene rubber (A) in this invention has a $\Delta Tg$ of 58° C. or more, preferably 60° C. to 90° C. When the $\Delta Tg$ is smaller than 58° C., the compatibility of the rubber (A) with other rubbers is inferior, and as a result the resulting rubber blend becomes greatly inferior in mechanical strengths. Also, the unsaturated nitrile-conjugated diene rubber contains components having a Tg of $-73°$ C. or less, in an integrated amount of existence probability of at least 5%, preferably at least 8%. The upper limit of the integrated amount of existence probability of the components is 50% in view of the oil resistance required. Owing to the presence of the components having a Tg of $-73°$ C. or less, the rubber (A) can have an improved compatibility with rubbers having a low polarity. When the rubber (A) contains the components in an integrated amount of existence probability of at least 5%, the rubber (A) has more improved mechanical properties such as tensile strength, elongation, flexure resistance, etc. The unsaturated nitrile-conjugated diene rubber (A) preferably has a Tg of $-63°$ to $-10°$ C. Further, the unsaturated nitrile-conjugated diene rubber (A) has an average bound nitrile content of 15 to 50% by weight, preferably 20 to 45% by weight from the viewpoint of oil resistance and cold resistance.

The Tg in this invention is explained referring to the accompanying drawings. In the drawings, FIG. 1 is a graph for determining Tg and $\Delta Tg$;

FIG. 3 (b) is a graph showing $\Delta Tg$ of a commercially available high nitrile NBR;

(1) Using a low temperature DSC (manufactured by Rigaku Denki), the change of the specific heat of a sample with temperature is measured at a temperature elevation rate of 20° C./min.

Figure 1:
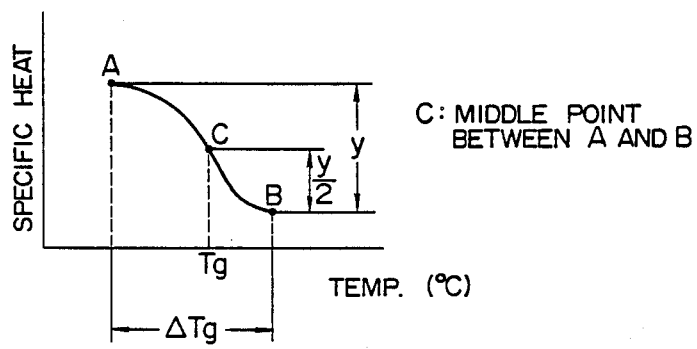

(2) The temperature determined from the curve obtained in the manner shown in FIG. 1 is referred to as Tg.

The $\Delta Tg$ in this invention is the difference between the temperature of point A and the temperature of point B in FIG. 1.

Figure 2:
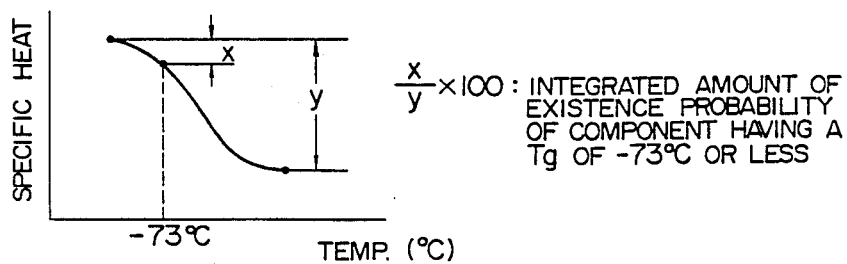
FIG. 2 is a graph for determining the integrated amount of existence probability of components having a Tg of $-73°$ C. or less in the unsaturated nitrile-conjugated diene rubber according to this invention.

The integrated amount of existence probability of components having a Tg of $-73°$ C. or less according to this invention, is a value obtained in the manner shown in FIG. 2.

Figure 3A:
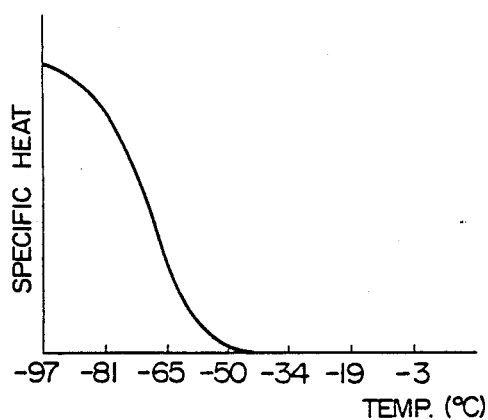
FIG. 3 (a) is a graph showing $\Delta Tg$ of a commercially available low-nitrile NBR.
Figure 3B:
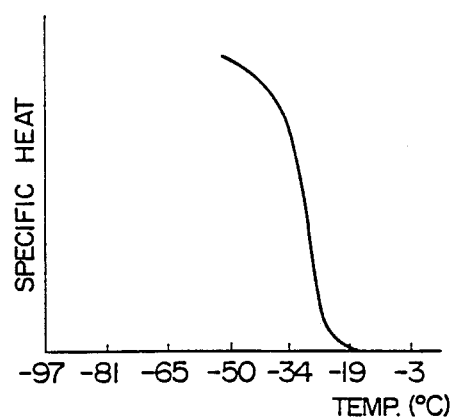

Incidentally, a commercially available low nitrile NBR (JSR N250S produced by Japan Synthetic Rubber Co., Ltd.) and a commercially available high nitrile NBR (JSR N220S produced by Japan Synthetic Rubber Co., Ltd.) were subjected to measurement of ΔTg in accordance with the procedure mentioned above, which showed that the ΔTg of the low nitrile NBR was 53° C. and that of the high nitrile NBR was 35° C. As appreciated also from FIG. 3 (a) for low nitrile NBR and FIG. 3 (b) for high nitrile NBR, the low nitrile NBR has, in general, a larger ΔTg than the high nitrile NBR.

The production of the unsaturated nitrile-conjugated diene rubber (A) of this invention is not critical. The rubber (A) can be produced by using, at the time of polymerization, a special technique as described later or by mixing unsaturated nitrile-conjugated diene rubbers of different Tg values. The polymerization method per se employed in the production of the rubber (A) is not critical, and any of emulsion polymerization, suspension polymerization, solution polymerization and bulk polymerization can be employed. Of these, emulsion polymerization is general.

The unsaturated nitrile-conjugated diene rubber (A) having a large ΔTg can be produced by, for example, adding the conjugated diene and the unsaturated nitrile, which are monomers to be copolymerized, and a molecular weight regulator to the polymerization system in portions at the time of polymerization. The timing of addition and the amount of each portion added may be varied depending upon the Tg and ΔTg of the desired unsaturated nitrile-conjugated diene rubber.

The method of mixing unsaturated nitrile-conjugated diene rubbers of different Tg values is not critical. At least two different unsaturated nitrile-conjugated diene rubbers may be mixed in the form of a latex or a solid. Or, alternatively, at least two different unsaturated nitrile-conjugated diene rubbers in the solid form may be kneaded together with other rubbers, carbon black, a plasticizer, a vulcanizing agent, etc.

The ethylene-propylene type copolymer rubber included in the (B) component of this invention is an ethylene-propylene copolymer rubber or an ethylene-propylene-non-conjugated diene copolymer rubber in which the non-conjugated diene is at least one member selected from ethylidenenorbornene, cyclopentadiene, 1,4-hexadiene, methylenenorbornene and 4,7,8,9-tetrahydroindene. As the (B) component, an ethylene-propylene-non-conjugated diene copolymer rubber is preferred.

The styrene polymer included in the (C) component of this invention may be a polystyrene, an acrylonitrile-styrene resin, an acrylonitrile-butadiene-styrene resin, an acrylonitrile-ethylene-propylene type copolymer rubber-styrene resin (hereinunder referred to as AES resin), a styrene-butadiene-styrene block copolymer, a styrene-isoprene-styrene block copolymer or a hydrogenated product thereof or the like. Of these, the AES resin, the styrene-butadiene-styrene block copolymer and hydrogenated products thereof are particularly preferred.

The polyalkenamer included in the (C) component of this invention may be trans-1,5-polypentenamer, a trans-polyoctenamer, or the like. Of these, the trans-polyoctenamer is particularly preferred.

The blending ratio of the (A) component to the (B) component is 90-10/10-90, preferably 80-20/20-80 (by weight). When the (B) component is an ethylene-propylene copolymer rubber and its content is less than 10 parts by weight, the composition of this invention has poor weather resistance. When the (B) component is the same as above and its content exceeds 90 parts by weight, the resulting composition is inferior in oil resistance. When the (B) component is a natural rubber or a polyisoprene rubber and its content is less than 10 parts by weight, the composition of this invention has poor mechanical strengths such as tensile strength, elongation, etc. When the component (B) is the same as above and its content exceeds 90 parts by content exceeds 90 parts by weight, the resulting composition is inferior in oil resistance.

The amount of the (C) component, namely, the styrene polymer and/or the polyalkenamer used is 0 to 50 parts by weight, preferably 0 to 20 parts by weight, and more preferably 5 to 20 parts by weight, per 100 parts by weight of the total of the (A) and (B) components. Even in the absence of the (C) component, the composition of this invention has sufficiently enhanced mechanical strengths; however, the addition of the (C) component improves the mechanical strengths further. When the amount of the (C) component added exceeds 50 parts by weight, the composition of this invention has an increased hardness and a reduced rubber elasticity.

The composition of this invention refers to a composition obtained by adding conventional rubber compounding ingredients such as carbon black, sulfur, a plasticizer, a process oil, a vulcanizing accelerator and the like to the (A), (B) and (C) components and kneading the resulting mixture by a conventional kneader such as a roll, a Banbury mixer or the like, and also refers to a vulcanized and shaped product of said composition.

The physical properties of the composition of this invention have been evaluated based mainly on JIS K 6301. The results thereof show that the composition of this invention has excellent mechanical properties and processability.

The rubber composition of this invention can be used in various industrial products such as hoses, packings, gaskets, oil seals, belts, boots and the like, utilizing such excellent mechanical strengths.

Further, the composition of this invention may be blended with polyethylene, polypropylene, polyvinyl chloride or the like, followed by, if necessary, dynamic crosslinking in order to use it as a thermoplastic elastomer in production of blow-molded articles, etc.

This invention is explained below in more detail referring to Examples; however, this invention is not limited to the Examples.

EXAMPLES 1 TO 6

In a glass autoclave were placed 1,500 g of water, 36 g of potassium rosinate, 51.1 g of butadiene (hereinunder referred to as BD), 5.7 g of acrylonitrile (hereinunder referred to as AN) and 0.11 g of t-dodecylmercaptan (hereinunder referred to as TDM). Polymerization was initiated at 5° C. by adding p-menthanehydroperoxide-ferrous sulfate, as a polymerization initiator. After the polymerization was effected for 2 hours, 7.6 g of AN, 26.5 g of BD and 0.14 g of TDM were further added (this addition is referred to as first further addition and the initial addition of AN, BD and TDM is referred to as the initial charge). Then, the resulting mixture was subjected to polymerization for 2 hours. Thereafter, a second further addition was made with the recipe shown in Table 5, and polymerization was conducted for 2 hours. Subsequently, a third further addition was made, and polymerization was conducted for 2 hours. In such a manner, the further addition and polymerization was repeated seven times. To the resulting latex was added octylated diphenylamine and unreacted monomers were removed using heated steam, after which the resulting latex was poured into an aqueous solution of aluminum sulfate to precipitate a rubber, which was then water-washed and dried.

Figure 4:
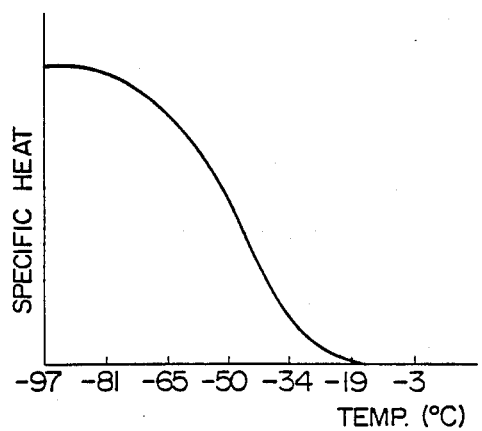
FIG. 4 is a graph showing $\Delta Tg$ of the NBR-1 or Example 1.

The NBR thus obtained was subjected to measurement of Tg and ΔTg in accordance with the procedure mentioned previously. The NBR (hereinunder referred to as NBR-1) had a Tg of −47° C. and, as shown in FIG. 4, the ΔTg was 71° C. The NBR-1 contained component having a Tg of −73° C. or less in an integrated amount of existence probability of 8%. Also, the average bound nitrile content of the NBR-1 as measured using a Coleman nitrogen analyser was 35% by weight.

The NBR-1 was further subjected to kneading with the compounding recipe shown in Table 1, and the resulting mixture was vulcanized for 20 min at 160° C., after which the vulcanized compositions obtained were evaluated for physical properties. The results are shown in Table 8.

EXAMPLES 7 TO 11

The NBR-1 obtained in Example 1 was mixed with polymers and compounding ingredients except vulcanizing agent with the compounding recipe shown in Table 2 in a Banbury mixer; the resulting mixture was taken out and placed on a roll; and a vulcanizing agent was added thereto on the roll. The temperature of the compound as taken out from the Banbury mixer was 175° C. The rubber blend thus obtained was vulcanized for 20 min at 160° C. The vulcanized product was subjected to evaluation of physical properties. The results are shown in Table 9.

EXAMPLE 12

Figure 5:
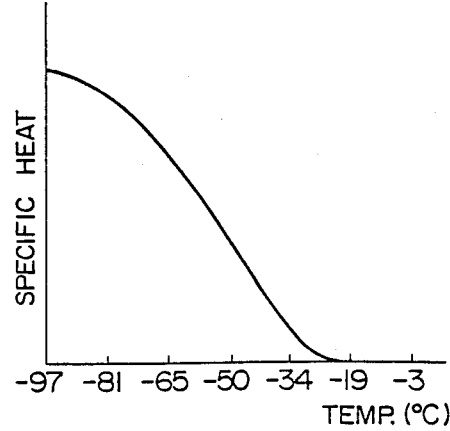
FIG. 5 is a graph showing $\Delta Tg$ of the NBR-2 of Example 12.

Polymerization was conducted under the same conditions as in Examples 1 to 6 with the polymerization recipe shown in Table 6. The rubber obtained is referred to as NBR-2. The NBR-2 had a Tg of −53° C. and, as shown in FIG. 5, the ΔTg was 72° C. The integrated amount of existence probability of components having a Tg of −73° C. or less was 18%. The NBR-2 had an average bound nitrile content of 32% by weight. Using the NBR-2, a rubber composition was prepared with the compounding recipe shown in Table 3 and physical properties thereof were measured. The results are shown in Table 10.

EXAMPLE 13

Figure 6:
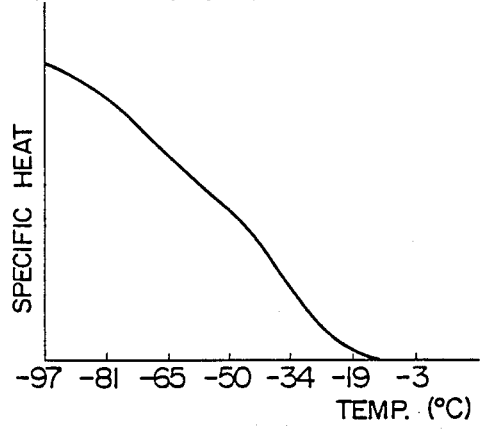
FIG. 6 is a graph showing $\Delta Tg$ of the NBR-3 of Example 13.

Polymerization was conducted under the same conditions as in Examples 1 to 6 with the polymerization recipe shown in Table 7. The rubber obtained is referred to as NBR-3. The NBR-3 had a Tg of −49° C. and, as shown in FIG. 6, the ΔTg was 83° C. The NBR-3 contained a large amount of component having a low Tg value, and the integrated amount of existence probability of components having a Tg of −73° C. or less was as large as about 20%. These points are characteristic. The NBR-3 had an average bound nitrile content of 33% by weight.

Using the NBR-3, a rubber composition was prepared with the compounding recipe shown in Table 3 and physical properties thereof were measured. The results obtained are shown in Table 10.

EXAMPLES 14 AND 15

Under the same conditions as in Examples 1 to 6, 160 g of AN, 840 g of BD and 2.2 g of TDM were subjected to polymerization. When the conversion reached 70%, the polymerization was terminated. The latex formed is hereinafter referred to as latex A. The latex A was subjected to coagulation and drying to obtain a solid rubber, which is hereinafter referred to as NBR-A. The NBR-A had a Tg of −64° C. and an average bound nitrile content of 21% by weight.

Separately, under the same conditions as in Example 1, 400 g of AN, 600 g of BD and 3.3 g of TDM were subjected to polymerization. When the conversion reached 70%, the polymerization was terminated. The latex formed is hereinafter referred to as latex B. The latex B was subjected to coagulation and drying to obtain a solid rubber, which is hereinafter referred to as NBR-B. The BNR-B had a Tg of −34° C. and an average bound nitrile content of 40% by weight.

Figure 7:
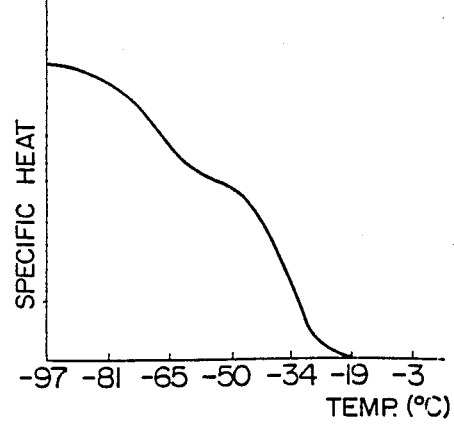
FIG. 7 is a graph showing $\Delta Tg$ of the NBR-A and the NBR-B in Examples 14 and 15. The Tg is determined according to the following procedure.

With 40 parts by weight of the latex A was mixed 60 parts by weight of the latex B, and the resulting mixture was subjected to coagulation to obtain a solid rubber, which is hereinafter referred to as NBR-AB. The NBR-AB had a ΔTg of 77° C. as shown in FIG. 7. The integrated amount of existence probability of components having a Tg of −73° C. or less was 14%. The NBR-AB had an average bound nitrile content of 32% by weight.

Rubber compositions were prepared with the compounding recipes shown in Table 3 (in Example 14, the weight ratio of NBR-AB/EPDM was 50/50 and, in Example 15, the weight ratio of NBR-A/NBR-B/EPDM was 20/30/50), and they were subjected to measurement of physical properties. The results obtained are shown in Table 10.

COMPARATIVE EXAMPLES 1 TO 3

Vulcanized rubber compositions were prepared by conducting kneading in accordance with the compounding recipes shown in Table 4 and then vulcanizing the resulting mixtures for 20 min at 160° C. The physical properties thereof were measured. The results obtained are shown in Table 11.

TABLE 1

Compounding Recipes

Unit: Parts by weight

|  | Example 1 | Example 2 | Example 3 | Example 4 | Example 5 | Example 6 |
|---|---|---|---|---|---|---|
| NBR-1 | 80 | 60 | 50 | 40 | 20 | 50 |
| JSR EP35*1 | 20 | 40 | 50 | 60 | 80 | 50 |
| JSR IR2200*2 |  |  |  |  |  |  |
| Zinc oxide | 5 | 5 | 5 | 5 | 5 | 5 |
| Stearic acid | 1 | 1 | 1 | 1 | 1 | 1 |
| FEF Carbon | 40 | 40 | 40 | 40 | 40 | 40 |
| Dioctyl adipate | 15 | 15 | 15 | 15 | 15 | 15 |
| Diphenylguanidine | 3 | 3 | 3 | 3 | 3 | 3 |

TABLE 1-continued

Compounding Recipes

| | Example 1 | Example 2 | Example 3 | Example 4 | Example 5 | Example 6 |
|---|---|---|---|---|---|---|
| Sulfur | 1.5 | 1.5 | 1.5 | 1.5 | 1.5 | 1.5 |

Note:
*[1] EPDM produced by Japan Synthetic Rubber Co., Ltd.
*[2] Polyisoprene rubber produced by Japan Synthetic Rubber Co., Ltd.

TABLE 2

Unit: Parts by weight

| | Example 7 | Example 8 | Example 9 | Example 10 | Example 11 |
|---|---|---|---|---|---|
| NBR-1 | 50 | 50 | 50 | 50 | 50 |
| JSR EP35 | 50 | 50 | 50 | 50 | |
| JSR IR2200 | | | | | 50 |
| JSR AES110*[1] | 5 | 10 | | | |
| JSR TR2000*[2] | | | 10 | | 10 |
| Vustenamer 8012*[3] | | | | 10 | |
| Zinc oxide | 5 | 5 | 5 | 5 | 5 |
| Stearic acid | 1 | 1 | 1 | 1 | 1 |
| FEF carbon | 40 | 40 | 40 | 40 | 40 |
| Dioctyl adipate | 15 | 15 | 15 | 15 | 15 |
| Diphenylguanidine | 3 | 3 | 3 | 3 | 3 |
| Sulfur | 1.5 | 1.5 | 1.5 | 1.5 | 1.5 |

Note:
*[1] AES resin produced by Japan Synthetic Rubber Co., Ltd.
*[2] Styrene-butadiene-styrene block copolymer produced by Japan Synthetic Rubber Co., Ltd.
*[3] Trans-polyoctenamer produced by Bunawerke Huls GmbH (West Germany)

TABLE 3

Unit: Parts by weight

| | Example 12 | Example 13 | Example 14 | Example 15 |
|---|---|---|---|---|
| NBR-2 | 50 | | | |
| NBR-3 | | 50 | | |
| NBR-A | | | | 20 |
| NBR-B | | | | 30 |
| NBR-AB | | | 50 | |
| JSR EP 35 | 50 | 50 | 50 | 50 |
| Zinc oxide | 5 | 5 | 5 | 5 |
| Stearic acid | 1 | 1 | 1 | 1 |
| FEF carbon | 40 | 40 | 40 | 40 |
| Dioctyl adipate | 15 | 15 | 15 | 15 |
| Diphenylguanidine | 3 | 3 | 3 | 3 |
| Sulfur | 1.5 | 1.5 | 1.5 | 1.5 |

TABLE 4

Unit: Parts by weight

| | Comparative Example 1 | Comparative Example 2 | Comparative Example 3 |
|---|---|---|---|
| JSR N230S*[1] | 50 | | 50 |
| JSR N240S*[2] | | 50 | |
| JSR EP35 | 50 | 50 | |
| JSR IR2200 | | | 50 |
| Zinc oxide | 5 | 5 | 5 |
| Stearic acid | 1 | 1 | 1 |
| FEF carbon | 40 | 40 | 40 |
| Dioctyl adipate | 15 | 15 | 15 |
| Diphenylguanidine | 3 | 3 | 3 |
| Sulfur | 1.5 | 1.5 | 1.5 |

Note:
*[1] NBR produced by Japan Synthetic Rubber Co., Ltd. Tg: −42° C., ΔTg: 38° C., Average bound nitrile content: 35% by weight
*[2] NBR produced by Japan Synthetic Rubber Co., Ltd. Tg: −56° C., ΔTg: 47° C., Average bound nitrile content: 26% by weight

TABLE 5

Polymerization Recipe of NBR-1

Unit: g

| | AN | BD | TDM |
|---|---|---|---|
| Amount of initial charge | 5.7 | 51.1 | 0.11 |
| Amount of 1st further addition | 7.6 | 26.5 | 0.14 |
| Amount of 2nd further addition | 22.3 | 79.9 | 0.31 |
| Amount of 3rd further addition | 26.9 | 64.0 | 0.34 |
| Amount of 4th further addition | 48.5 | 99.2 | 0.56 |
| Amount of 5th further addition | 53.2 | 83.2 | 0.60 |
| Amount of 6th further addition | 81.0 | 112.2 | 0.89 |
| Amount of 7th further addition | 87.0 | 151.6 | 0.93 |

TABLE 6

Polymerization Recipe of NBR-2

Unit: g

| | AN | BD | TDM |
|---|---|---|---|
| Amount of initial charge | 18.3 | 164.6 | 0.35 |
| Amount of 1st further addition | 24.5 | 85.2 | 0.44 |
| Amount of 2nd further addition | 11.0 | 13.4 | 0.16 |
| Amount of 3rd further addition | 14.5 | 34.3 | 0.18 |
| Amount of 4th further addition | 16.9 | 31.9 | 0.20 |
| Amount of 5th further addition | 19.0 | 29.8 | 0.21 |
| Amount of 6th further addition | 118.4 | 174.3 | 1.19 |
| Amount of 7th further addition | 116.7 | 127.2 | 1.25 |

TABLE 7

Polymerization Recipe of NBR-3

Unit: g

| | AN | BD | TDM |
|---|---|---|---|
| Amount of initial charge | 15.6 | 140.6 | 0.30 |
| Amount of 1st further addition | 21.0 | 72.9 | 0.37 |
| Amount of 2nd further addition | 30.1 | 94.8 | 0.42 |
| Amount of 3rd further addition | 37.1 | 88.0 | 0.47 |
| Amount of 4th further addition | 43.3 | 81.6 | 0.52 |
| Amount of 5th further addition | 48.9 | 76.1 | 0.55 |
| Amount of 6th further addition | 53.3 | 71.1 | 0.61 |
| Amount of 7th further addition | 59.1 | 65.3 | 0.64 |

TABLE 8

| Content of polymer (weight ratio) | Example 1 NBR-1/EP 35 = 80/20 | Example 2 = 60/40 | Example 3 = 50/50 | Example 4 = 40/60 | Example 5 = 20/80 | Example 6 NBR-1/IR2200 = 50/50 |
|---|---|---|---|---|---|---|
| Tensile strength (kgf/cm$^2$) | 210 | 205 | 200 | 202 | 205 | 216 |
| Elongation (%) | 410 | 400 | 390 | 410 | 400 | 480 |
| Fatigue by elongation*$^1$ (Number of repetitions) | $7.0 \times 10^4$ | $6.0 \times 10^4$ | $6.0 \times 10^4$ | $6.0 \times 10^4$ | $5.5 \times 10^4$ | $3.0 \times 10^5$ |
| Resistance to crack growth*$^2$ (Crack growth stress) (kgf/cm$^2$) | 21.6 | 20.3 | 19.2 | 19.8 | 18.5 | 23.6 |

*$^1$Using a de Mattia flexure tester, a JIS No. 3 dumbbell was subjected to repeated elongation of 0 - 150% 300 times per min. and the number of repetitions of elongation to reach breakage of the dumbbell was measured.

*$^2$A vulcanized rubber sample of 1.5 cm in width, 15 cm in length and 4 mm in thickness was used. A crack of 1 mm in depth was formed on this sample at a place of 7.5 cm from both ends; then the sample was elongated at a drawing speed of 50 mm/min; and a stress when the crack began to grow was measured. This test was conducted as a model test for examining laminar peeling of vulcanized rubbers which appears often in a blend of an NBR with a rubber having a low polarity.

TABLE 9

| | Example 7 | Example 8 | Example 9 | Example 10 | Example 11 |
|---|---|---|---|---|---|
| Tensile strength (kgf/cm$^2$) | 216 | 220 | 218 | 217 | 230 |
| Elongation (%) | 380 | 360 | 380 | 370 | 460 |
| Fatigue by elongation (Numbers of repetitions) | $8.0 \times 10^4$ | $7.0 \times 10^4$ | $7.5 \times 10^4$ | $7.0 \times 10^4$ | $4.0 \times 10^5$ |
| Resistance to crack growth (crack growth stress) (kgf/cm$^2$) | 23.1 | 25.8 | 26.2 | 25.5 | 29.1 |

TABLE 10

| | Example 12 | Example 13 | Example 14 | Example 15 |
|---|---|---|---|---|
| Tensile strength (kgf/cm$^2$) | 201 | 205 | 197 | 203 |
| Elongation (%) | 410 | 420 | 420 | 420 |
| Fatigue by elongation (Number of repetitions) | $6.0 \times 10^4$ | $6.5 \times 10^4$ | $6.0 \times 10^4$ | $6.0 \times 10^4$ |
| Resistance to crack growth (Crack growth stress) (kgf/cm$^2$) | 18.9 | 19.1 | 19.5 | 18.3 |

TABLE 11

| | Comparative Example 1 | Comparative Example 2 | Comparative Example 3 |
|---|---|---|---|
| Tensile strength (kgf/cm$^2$) | 130 | 123 | 151 |
| Elongation (%) | 240 | 220 | 380 |
| Fatigue by elongation (Number of repetitions) | $2.5 \times 10^3$ | $2.0 \times 10^3$ | $9.3 \times 10^3$ |
| Resistance to crack growth (crack growth stress) (kgf/cm$^2$) | 8.2 | 8.0 | 10.2 |

What is claimed is:

1. An oil-resistant rubber composition comprising (A) 90 to 10 parts by weight of an unsaturated nitrile-conjugated diene rubber having a ΔTg of 58° C. or more and an average bound ntirile content of 15 to 50% by weight, and (B) 10 to 90 parts by weight of at least one rubber selected from the group consisting of an ethylene-propylene copolymer rubber, a natural rubber and a polyisoprene.

2. The oil-resistant rubber composition according to claim 1, wherein the unsaturated nitrile-conjugated diene rubber (A) is a copolymer of acrylonitrile or methacrylonitrile and butadiene or isoprene.

3. The oil-resistant rubber composition according to claim 1, wherein the ΔTg ranges from 60° to 90° C.

4. The oil-resistant rubber composition according to claim 1, wherein the unsaturated nitrile-conjugated diene rubber (A) contains components having a Tg of −73° C. or less in an integrated amount of existence probability of at least 5%.

5. The oil-resistant rubber composition according to claim 1, wherein the (B) component is an ethylene-propylene copolymer rubber.

6. The oil-resistant rubber composition according to claim 5, wherein the ethylene-propylene copolymer rubber is an ethylene-propylene-non-conjugated diene in which the non-conjugated diene is at least one member selected from ethylidenenorbornene, cyclopentadiene, 1,4-hexadiene, methylenenorbornene and 4,7,8,9-tetrahydroindene.

7. The oil-resistant rubber composition according to claim 6, wherein said ethylene-propylene copolymer rubber is ethylene-propylene-ethylidene norbornene copolymer rubber.

8. The oil-resistant rubber composition according to claim 1, wherein the average bound acrylonitrile content of the unsaturated nitrile-conjugated diene rubber (A) is 20 to 50% by weight.

* * * * *